United States Patent

Sitnikov et al.

[15] 3,683,207

[45] Aug. 8, 1972

[54] PRESETTABLE SELF-CORRECTING STAIRCASE COUNTER

[72] Inventors: Leonid Semenovich Sitnikov, ulitsa Trudovykh rezervov, 56, kv. 12; Lev Lazarevich Utyakov, ulitsa Trudovykh rezervov, 56, kv. 22; Alexandr Grigorievich Skorik, pereulok Zapadny, 3/2, kv. 65, all of Kiev, U.S.S.R.

[22] Filed: Oct. 20, 1970

[21] Appl. No.: 82,546

[30] Foreign Application Priority Data

Mar. 21, 1966 U.S.S.R. ....................1,062,319
July 15, 1966 U.S.S.R. ....................1,088,209

Related U.S. Application Data

[63] Continuation of Ser. No. 863,030, Sept. 29, 1969, abandoned.

[52] U.S. Cl. ....................307/225, 307/227, 307/297
[51] Int. Cl. ....................H03k 25/02
[58] Field of Search....................307/225, 227, 293, 297

[56] References Cited

UNITED STATES PATENTS

| | | | |
|---|---|---|---|
| 2,829,280 | 4/1958 | Goodall | 307/227 |
| 2,873,388 | 2/1959 | Trumbo | 307/227 X |
| 3,111,591 | 11/1963 | Conron et al. | 307/225 |
| 3,121,803 | 2/1964 | Watters | 307/225 |
| 3,233,116 | 2/1966 | Watrous | 307/225 |
| 3,267,289 | 8/1966 | Washington et al. | 307/293 X |
| 3,378,698 | 4/1968 | Kadah | 307/227 X |
| 3,435,193 | 3/1969 | Aitchison | 307/227 X |

*Primary Examiner*—John S. Heyman
*Attorney*—Waters, Roditi, Schwartz & Nissen

[57] ABSTRACT

A pulse-position multistable device to be utilized in automation, counting and measuring digital instruments for storing multivalued information and counting electrical pulses, said device being based on a counter with a storage capacitor including no trimming elements, wherein a comparator (reference) voltage is developed by the very circuit of the device, the value of the later voltage being changed in the process of operation, thus compensating for the change of the parameters of the circuit components owing to which the range of retaining a desired value of the scaling factor is widened.

10 Claims, 4 Drawing Figures

PRESETTABLE SELF-CORRECTING STAIRCASE COUNTER

This application is a continuation of Ser. No. 863,030, filed Sept. 29, 1969, now abandoned.

The present invention relates to radio electronics and can be used in automation, computers and digital measuring techniques and particularly in digital measuring instruments.

There are known pulse-position multistable devices such as pre-settable self-correcting stair case counters employ-ing capacitor-type accumulators. In the accumulator of such devices, the shaper input is connected to an external source of cycle pulses, and the output to a blocking capacitor which is also connected through a gate to a storage capacitor. The storage capacitor is connected to one of the inputs of a comparator the output of which is to the storage capacitor discharge circuit. Connected to the other input of the comparator is a source of reference voltage $U_{ref.}$ To adjust the accumulator to a division factor n, the level of the reference voltage $U_{ref.}$ should lie between the levels $U^{(n-1)}$ and $U^{(n)}$, where $U^{(n-1)}$ is the voltage across the storage capacitor with $n$—1 cycle pulses having arrived to the accumulator input, and $U^{(n)}$ is the voltage with $n$ cycle pulses having arrived thereat. This provides for maximum possible varying of cycle pulse parameters, as well as of the values of the blocking and storage capacitors. If the inequality:

$U^{(n-1)} < {}^{U}{}_{ref.} < U_c^{(n)}$ is disturbed, the accumulator division factor varies from $n$ up to $n$—1 or n+1.

To increase operation stability of the accumulator, there are used an input pulse amplitude or duration shaping unit, a linearizing circuit, and/or an output pulse shaper (refer to Author's Certificate U.S.S.R. Pat. No. 165,579; U.S. Pat. Nos. 3,123,723; 3,111,591; 3,105,158; 3,121,803; 3,150,271.

A disadvantage of known pulse-position devices employing an accumulator is the critical response to variation of supply voltages, of the devices component parameters and temperature. Another disadvantage resulting from the first one is the necessity of introducing a trimming element into the circuit. The aforementioned disadvantages result in increasing the cost of the device, impairing its reliability and complicating its manufacture.

An object of the present invention is to eliminate the aforementioned disadvantages.

The principle object of the invention is to develop a trouble-free pulse-position multistable device without trimming elements which is not critically responsive to variation of supply voltages, component parameters and temperature.

Said principle object is achieved due to the fact that in the pre-settable self-correcting staircase counter device 1 according to the invention there is connected to the comparator input an electrical circuit consisting of a capacitive element and a discharge element connected in parallel such that, during one operation cycle of the device, the amount of power fed to the capacitive element is equal to the amount of power escaping through the discharge element, the capacitive element being connected to a voltage pulse shaping means, the voltage of which exceeds that corresponding to a certain constant division factor.

In the device, it is expedient to employ a capacitor as the capacitive element and a resistor as the discharge element.

One of the embodiments of the device employs a blocked p-n junction capacitance as the capacitive element and a resistor as the discharge element.

It is preferable to employ a capacitor as the capacitive element and nonlinear resistance as the discharge element.

In the pulse-position multistable device of the invention, it is possible to use a blocked p-n junction capacitance as the capacitive element and a controlled resistance as the discharge element.

The electric circuit employing a capacitive element and a discharge element should be connected to the zero potential point of the device.

In the pulse-position multistable device of the invention, the electric circuit employing a capacitive element and a discharge element may be connected to the bias source of said device.

It is most expedient to connect the capacitive element to a voltage pulse shaping means, the voltage of which exceeds that corresponding to a certain constant division factor, through a gate.

Given below is a detailed description in which the essence of the present invention is disclosed to be had in conjunction with the accompanying drawings, wherein.

Figure 2:
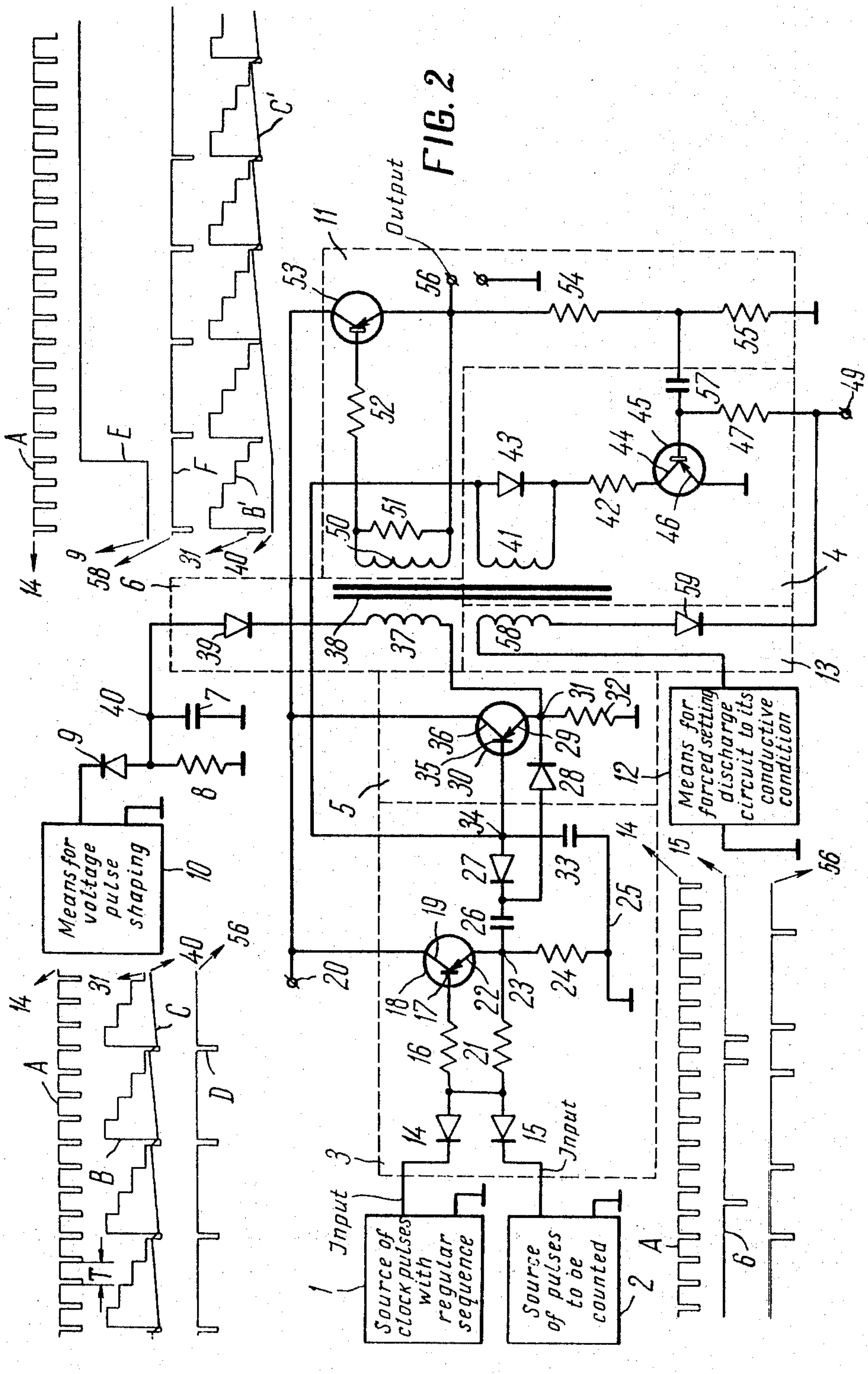
FIG. 2 is a circuit diagram of the a preferred embodiment of the invention.
Figure 3:
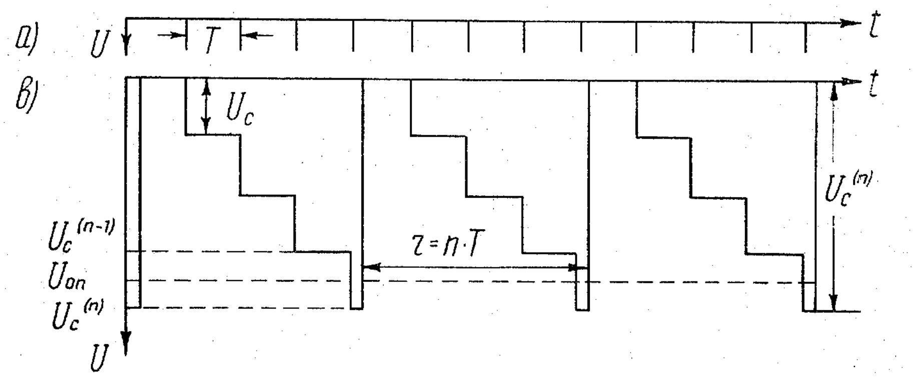
Figure 4:
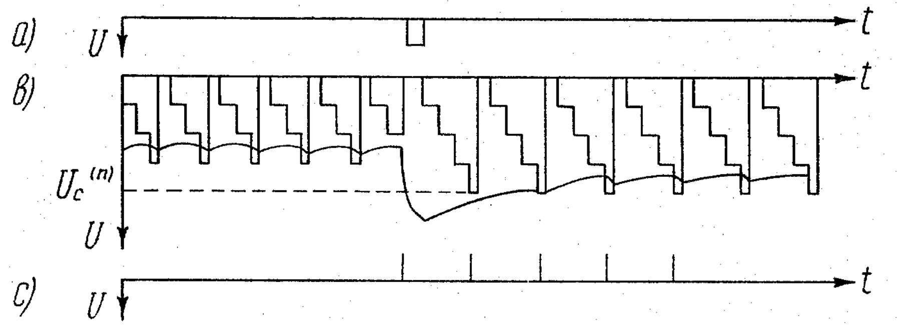

FIG. 3*a* is a time diagram of voltages across the emitter of the transistor of the input shaper of the device;

FIG. 3*b* is a time diagram of voltages across the storage capacitor in the operating mode;

FIG. 4*a* is a time diagram of voltages across the output of the voltage pulse shaper;

FIG. 4*b* is a time diagram of voltages across the storage capacitor during the setting of the assigned division factor; and FIG. 4*c* is a time diagram of voltages fed to the input of the information recording winding (FIG. 2).

The specific terms employed are intended to aid in understanding and should be interpreted as being illustrative and not limiting. It is to be understood that each term embraces all equivalent elements adapted to operate in an analogous way.

Figure 1:
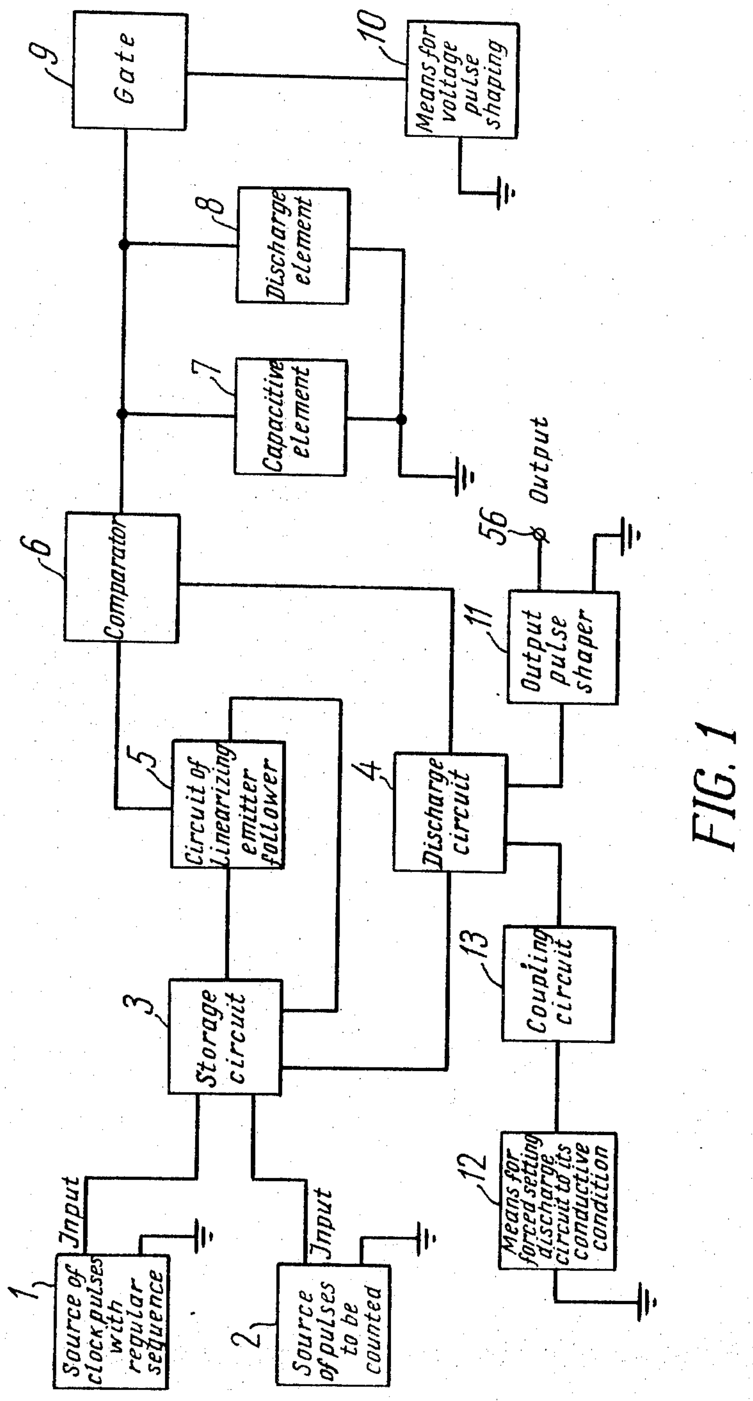
FIG. 1 is a block diagram of a device according to the invention.

Referring now to FIGS. 1 and 2, there is shown a source 1 of regular successive clock pulses and a source 2 of pulses to be counted. Both of the sources are coupled with the storage circuit 3, the latter being connected to its discharge circuit 4 and to the circuit 5 of a linearizing emitter follower. The said circuit 5 is connected to one of comparator 6 inputs with its other input coupled to ground through a capacitive element 7 and a discharge element 8 connected in parallel and through a gate 9 to means 10 for voltage pulse shaping.

The discharge circuit 4 is connected to a shaper 11 of the output pulse of the device and through a coupling circuit 13 to means 12 for forced setting the discharge circuit 4 to its conductive condition.

The source 1 of regular successive clock pulses may include an oscillator, for example a multivibrator, and a shaper of negative pulses. One output terminal of the source 1 is connected to ground, and another one to the anode of a diode 14, the cathode of which is coupled with the cathode of a diode 15 and the latter anode is connected to the output terminal of the source 2 of the pulses to be counted. The other output terminal of the source 2 is coupled with ground. The cathodes of the diodes 14 and 15 through a resistor 16 are connected to a base electrode 17 of a N-P-N transistor 18. A collector electrode 19 of the transistor 18 is connected to a source 20 of direct voltage with negative polarity. A resistor 21 coupled with an emitter electrode 22 of the transistor 18 is connected to the cathodes of the diodes 14 and 15 and to the resistor 18.

The point 23 of coupling an emitter electrode 22 and resistor 21 through a resistor 24 is connected to a ground conductor 25.

The resistors 16, 21, 24 and the transistor 18 form an input amplifier-limiter of the storage circuit 3 executed according to the circuit with a common collector having small output resistance.

The point 23 is connected to the anode of a diode 27 through a capacitor 26. The anode of the diode 27 is coupled with the cathode of a diode 28 the anode of which is connected to an emitter electrode 29 of an N-P-N transistor 30. The point 31 of coupling an emitter electrode 29 of the transistor 30 with the diode 28 is connected through a resistor 32 to ground. The cathode of the diode 27 through a capacitor 33 is coupled with the ground conductor 25. The point 34 of coupling the cathode of the diode 27 with the capacitor 33 is connected to a base electrode 35 of the transistor 30 which collector electrode 36 is coupled to the source 2.

All the circuitry of the capacitors 26 and 33, the diodes 27 and 28, the transistor 30 and the resistor 32 constitute a conventional circuit of linearized capacitor storage wherein voltage stair-steps across the storage capacitor 33 are of the same size. The point 31 through a winding 37 of a transformer 38 is connected with the anode of a diode 39 and the latter cathode is coupled with one of the capacitor 7 terminals, the other one of the capacitor being connected to ground.

The coupling point 40 of the cathode of the diode 39 and the capacitor 7 is connected to ground through the resistor 8. The winding 37 and the diode 39 constitute a comparator which one input is connected to the point 31 of the said capacitor storage and the other one (point 40 to the inparallel connected capacitor 7 and resistor 8 which both develop reference voltage in the course of the device operation. To the point 40 there is connected the cathode of the diode 9 which anode is coupled to one of the output terminals of the shaper 10 of the negative voltage pulse causing initial charging of the capacitor 39, the other output terminal of the shaper 10 being connected to ground.

The point 34 through a winding 41 of the transformer 38 is connected with one end of a resistor 42. In parallel to the winding 41 there is connected a diode 43 so that its cathode is coupled to the point 34. The other end of the resistor 42 is coupled to a collector electrode 44 of a N-P-N transistor 45 with its emitter electrode 46 connected to ground.

The winding 41, the resistor 42 and the transistor 45 form the discharge circuit of the storage capacitor 33. In order to improve disturbance immunity of the device a resistor 47 is coupled with a source 49 of a small direct positive voltage thereby biasing a base-emitter junction of the transistor 45 in reverse direction. The winding 50 of a transformer 38, resistors 51, 52, 54, 55 and the N-P-N transistor 53 constitute the said shaper 11 of the output pulses, the output pulses being taken from its terminals 56. A capacitor 57 is incorporated to accelerate the blocking-process in discharging the storage capacitor 33.

A winding 58 of the transformer 38 together with a diode 59 form the coupling circuit 13 of the device with the means 12 for force setting the discharge circuit 4 to its conductive condition.

The anode of the diode 59 is connected to the source 49 also with the aim of improving disturbance immunity of the device.

Principle of operation of the device in question must best be understood in considering the following operation conditions: frequency division of clock pulses with regular sequence, automatic setting the device to a desired value of the scaling factor and counting of input pulses.

In initial position with the device operating in condition of frequency division of clock pulses with regular sequence all the transistors are nonconductive and the capacitors are discharged except the capacitor 7 which has been charged to a voltage amount equal to a desired value of the scaling factor as will be disclosed further.

In this condition the negative polarity clock pulses A with regular sequence arrive with occurrence period T from the source through the diode 14 and the limiting resistor 16 to the base electrode 17 of the transistor 19 and bias the latter to its conductive condition. This results in charging the capacitors 26 and 33 from the source 20 through the transistor 19 and the diode 27 up to a voltage amount inversely proportional to the values of capacitance of the said capacitors. The transistor 30 is cut-in and the voltage at the point 31 becomes nearly equal to that at the point 34. On ceasing the clock pulse action the capacitor 26 through the transistor 30, the diode 28 and the resistor 26 is recharged up to an amount of voltage close to that across the storage capacitor 33. With arrival of the next clock pulse this voltage at the point 34 is increased again by one step. Due to the circuit 5 to be in action consisting of the diode 28 and the linearizing emitter follower including the transistor 30 and resistor 32 all steps are of the same size (in FIG. 2 voltage form is labeled with B). Such a feedback improves the capacitor storage circuit permitting the scaling factors to be rather high because the last step equals the first one and the step value is large enough to fire the comparator.

At the moment when the voltage amount at the point 34 and at the point 31 respectively with arrival of the next clock pulse exceeds the amount of the reference voltage (voltage at the point 40, labeled with C in FIG. 2) a current pulse charging additionally the capacitor 7 flows through the winding 37 and the diode 39. Current flowing through the winding 37 stimulates the blocking process thereby biasing the transistor 45 to its conductive condition and the storage capacitor 33 is discharged through the transistor 45, the limiting resistor 42 and the winding 41 of the transformer 38, the transistor 53 being cut-in thus developing an output pulse (a series of pulses is labeled with D in FIG. 2).

Then a new cycle of the stair-step increase of voltage is initiated across the storage capacitor till the next firing of the comparator. During a period of time between two firings of the comparator the capacitor 7 is discharged through the resistor 8. During the next firing of the comparator the capacitor 7 is again charged additionally.

With nonvariable parameters of the device the value of additional charging of the capacitor 7 in the moment of comparation is equal to that of its discharging through the resistor 8 during the time interval between the two successive firings of the comparator 6. If the device parameters of external conditions are varied by the next moment of the capacitor 6 firing then the difference between the voltage levels at the point 40 and the point 31 will be varied as well. With the device parameters being varied so that the level of the upper step of the voltage at the point 31 is increased as compared with the voltage level in the before going operation cycle of the storage circuit, the capacitor 7 assumes the greater charge and the average value of the reference voltage at the point 40 is also increased.

It is the level being decreased of the voltage upper step at the point 31 that the less value of additional charging of the capacitor 7 is matched.

Thus, there developed automatically a new average level of the reference voltage corresponding to the earlier scaling factor with the device parameters varied. Such formation of the reference voltage makes it possible to develop pulse-position multistable devices nonresponsible to variation of the ambient temperature and parameters of the radio components of the device.

Automatic setting of the device to a desired value of the scaling factor results in the following: the sources 20 and 49 of supply being cut-in the clock pulses A start arriving from the source 1 and secure the process of stairstep increase of voltage (labeled with B in FIG. 2) across the storage capacitor, the capacitor 7 is charged through the diode 9 from the mains 10 of voltage pulse shaping (labeled with F in FIG. 2), the value of voltage level across it being more than required for a desired value of the scaling factor. If the desired value of the scaling factor equals, for example, 10 then the initial level fits the scaling factor equal to 12–13. At the same time from the means 12 for forced setting the discharge circuit 4 to its conductive condition pulses of sequence F (as labeled in FIG. 2) start arrival with frequency in accordance with a desired value of the scaling factor of the device which are in step with clock pulses arriving from the source 1.

If the scaling factor is equal, for example, to 10 then the frequency of reference sequence pulses is 10 times as less as that of clock pulses. A pulse of the reference sequence arrives to the coupling circuit 13 stimulating the blocking process and causes biasing the transistor 45 to its conductive condition and discharging the storage 33. At this time the diode 39 of the comparator 6 is remained cut-off since by a moment of arrival of a pulse of the reference sequence F to the coupling circuit 13 the voltage value at the point 31 (labeled with B′ in FIG. 2) is less than that at the point 40. At the same time the capacitor 7 is discharged through the resistor 8 not having been charged additionally. Therefore the voltage value at the point 40 (labeled with C′ in FIG. 2) is being decreased all the time untill the voltage value at the point 31 becomes greater than that at the point 40 by the arrival of the next pulse of the reference sequence F.

From this moment of time the voltage mean value is set at the point 40 to provide for the triggering the blocking process causing by comparator firing. Afterwards the source of the reference sequence F of pulses arriving from the means 12 may be cut off. The further operation of the device proceeds in a manner described in the first condition.

The circumscribed automatic setting of a desired value of the scaling factor makes it possible to develop pulse-position multistable devices without trimming elements or elements requiring manual selection with all components of the device having significant spread of parameters.

In operation of the pulse-position multistable device in condition of counting electrical pulses the count pulses from the source 2 arrive to the device input in addition to the clock pulses of the regular sequence A. The count pulses may be both of regular or of irregular sequence (labeled with G in FIG. 2) and at the this case shouldn't coincide in time with the clock pulses.

The sequence of pulses to arrive from the output of the pulse-position device is to be compared with that of the pulses arriving from the output of the reference pulse source. Any frequency divider having the same division factor and scaling factor of the said device may be useful in this instance as such a source.

Until the count pulses arrive to the device the output pulses of the said devices are coincident and phase difference (time interval) between the output pulses is equal to zero.

With arrival of a count pulse from the source 2 to the device a pulse of the output shaper 11 will appear at the output 56 (labeled with D′ in FIG. 2) sooner than at the reference device output, the information thus being encoded with the phase difference of the pulses from the outputs of the said devices.

During the interval between the count pulses to arrive the device is operative in condition of storing information as the phase difference is not varied by arrival of the next pulse.

In this way pulses may be counted and information be stored in *n*-fold counting system. If the pulse-position multistable device operates only in a condition of storing information, for example in a register of memory, then the source 2 of count pulses is not employed and information is recorded by way of applying a reset pulse from the means 12 for forced setting the discharged circuit 4 to its conductive condition. The reset pulse causes firing of the discharge circuit 4 with shift in regard to an output pulse of the reference device by an amount of time interval $t = kT$, where $k$ is the phase difference recorded.

It is obvious that in manufacturing instruments incorporating some described pulse-position multistable devices the scaling factors of the latter are to be equal, in this case the source 1, the means 10 of voltage pulse shaping and the means 12 may serve as common components for all pulse-position devices of a given instrument thereby decreasing the number of its auxiliary devices. rage circuit 3 and a shaper 11 and an "OR"

circuit at the shaper input. The output of the storage circuit 3 is connected via linearizing emitter follower 5 to a comparator 6 an output of which is connected to ground through a capacitive element 7 and discharge element 8 connected in parallel and through gate 9 to voltage pulse shaper 10 the voltage of which exceeds that corresponding to a certain constant division factor.

Comparator 6 is also connected to discharge circuit 4 of the storage circuit 3 which is provided with output shaper 11.

A circuit 12 for setting discharge circuit 4 in conductive condition is connected by coupling circuit 13 to circuit 4. Shaper 11 has an output terminal 56. Circuit 5 is connected in feedback relation with circuit 3.

As can be seen from FIG. 2, in the preferred embodiment of the circuit, the shaper of the storage circuit 3 employs transistor 18 including base 17, collector 19 and emitter 22 and there is a diode circuit including diodes 14 and 15 in the base circuit. The output of the shaper is connected to the storage circuit 3 comprising blocking and storage capacitors 26 and 33, respectively, as well as diodes 27, 28. An emitter follower employing transistor 30 functions as the linearizing circuit 5. The emitter 29 of the transistor 30 functions as the output of the storage circuit 3 and is connected through winding 37 to the diode 39 of comparator 6 the second input of which is connected to ground through capacitor 7 and resistor 8 connected in parallel, and through the diode 9 to pulse shaper 10 the voltage of which exceeds that corresponding to a certain constant scaling factor. The output winding 50 of the comparator 6 has a transformer coupling with the winding 37 and is connected to the resetting circuit employing transistors 53 and 45. The transistor 54 simultaneously serves as an output shaper. The collector 44 of the transistor 45 is connected to the storage capacitor 33 through regeneration winding 41 and limiting resistor 42. Winding 58 serves for recording information.

The device operates as follows.

Fed to the input diode 15 from an external source (2) are cycle clock pulses with a period T (FIG. 3*a*). With the arrival of each pulse, voltage Uc (FIG. 3*b*) at the output of the storage circuit 3 receives a certain increment. As the voltage Uc reaches the level of the reference voltage $U_{ref.}$ of the comparator 6 the latter starts the resetting circuit 4 thus causing the voltage of the storage capacitor 33 to be reset to the initial value and simultaneous generation of an output pulse. The output pulse of the device is picked up from the emitter 29 of the transistor 30.

Since the voltage increment across the accumulator 3 is small as compared to the level of the reference voltage $U_{ref.}$ the latter is obtained after the arrival of several cycle pulses; i.e., the device generally operates as a frequency divider, the division or scaling factor being specified by the parameters of the pulses at the output of the input shaper by the level of the reference voltage $U_{ref.}$ and by the parameters of the storage circuit 3. To obtain the assigned or predetermined value of the division or scaling factor, it is necessary to effect the initial setting of the value of the reference voltage $U_{ref.}$ For said purpose, the capacitor 7 should be forcibly charged through the diode 39 via the terminal 20 connected to a source 1 of short-time voltage pulses (FIG.4*a*) to a voltage exceeding that corresponding to the desired division factor. Then the external source of the reference train of pulses, (FIG.4*c*) whose frequency corresponds to the required division factor, is connected to the recording winding 58. In this case the storage capacitor 33 is discharged with the arrival of a pulse of the reference train (FIG.4*b*) after the arrival of every *n* cycle pulses, whereby the voltage $Uc^{(n)}$ is fed from the output 31 through winding 37 to the input of the comparator 6. However, the diode 39 of the comparator 6 does not conduct, $U_{ref.}$ $U_c^{(n)}$, since the capacitor 7, if fed with a voltage exceeding that corresponding to the desired division factor *n*.

During the process of setting the desired scaling or division factor the capacitor 7 will be discharged through the resistor 8 until the reference voltage $U_{ref.}$ is changed to a new value such that:

$$U_c^{(n-1)} < U_{ref.} < U_c^{(n)}$$

and after the reference pulses have ceased to be fed the set value of the division factor equal to *n* remains unchanged. Now, the assigned value of the reference voltage $U_{ref.}$ is maintained across the capacitor 7 as a result of its charging by the voltage $U_c^{(n)}$ (at the moment of comparison) through the winding 37 and the diode 9 and discharging through the resistor 8. It is evident that any change of the voltage $U_c^{(n)}$ (FIG. 3*b*) across the storage capacitor 33 results in a proportional shift of the reference level $U_{ref.}$ due to which the efficiency of the device is not disturbed within wide ranges of parameter variations which influence the level of the voltage $U_c^{(n)}$. As a consequence the invention provides a control means(inclusive of the capacitive element and discharge element)which produces a source of reference voltage to automatic-ally maintain a constant scaling factor independent of parameter changes in the device.

Since, during operation of the device, the frequency of pulses fed to the diodes 14 and 15 may vary, the value of discharge of the capacitor 7, will vary between the comparison moments. Accordingly, the value of the additional or boost charge of the capacitor 7 should vary at the comparison moment. This is ensured by a certain tolerable drift of the reference voltage $U_{ref.}$ relative to the voltage across the storage capacitor 33.

The device output pulses follow with the period $\tau= nT$, where *n* is the scaling or division factor and *T* is a period of cycle pulses matching one of the cycle pulses. If one of the trains of the device output pulses is assumed to be the reference one, the other trains of output pulses will be shifted with respect to the former by the time $t_i = iT$ ($i$=0,1,2, . . . . ,*n*-1). Thus, the device can assume one of the states characterized by a phase (shift$t_i$ ) of the output pulses relative to the reference train; each time as a pulse arrive, from the external source (not shown in the drawings) to the diodes 15 of the "OR" circuit the device will change the phase through one period of cycle pulses.

To record the information in the device, is is sufficient to actuate the resetting circuit at least once with a shift relative to the reference pulse by a value $t = kT$, where k is the number of periods of cycle pulses fed to the device input until it starts operating. This is achieved by feeding one or several pulses with a respective phase to the input of the resetting circuit.

Obviously, the application of pulse-position devices in counting and other systems is possible, provided the division factors of all pulse-position devices of the system in use are equal.

The pulse-position multistable device proposed herein proved to preserve efficiency in a considerably wider range of variations of component parameters, supply voltages and a temperature than the known pulse-position device employing accumulators, Thus, for example, the division factor of the device of the invention remains equal to 10 in case of a two-fold change of the ratio of the blocking and the storage capacitors 26 and 33, whereas in all hitherto known devices the permissible change of said ratio with the same value of the division factor does not exceed ±5 percent.

It is evident that the electrical circuit consisting of capacitive and discharge elements 7 and 8 can be rather efficiently used in the pulse-position device employing a synchronized capacitive relation self-oscillator.

On the basis of the device of the present invention, a number of embodiments of decimal memory elements as well as dividing and counting decades have been developed. As compared with the trigger decade, the pulse-position counting decade comprises three times fewer parts whereby overall dimensions, weight and cost of the device are reduced. Power consumption of the pulse-position decade is substantially small that provides for lower load factors of its component parts. A smaller number of parts in use and lower load factors provide for a smaller possibility of surprise troubles; i.e. for three or four-fold increase of average time of trouble-free operation of the decade.

Test results have proved that the pulse-position decades developed in accordance with the proposed block-diagram reliably operate within temperature ranges up to +65° C (if germanium transistors are in use) at ±10 percent supply voltage variations and a 10 per cent spread of the device component parameters. Moreover, no adjustment of the device is needed during its manufacture and replacement of parts.

Comparison with the now existing instruments of similar make proves that application of the herein proposed pulse-position multistable devices ensures a two-to-four-fold gain in overall dimensions, weight, cost, power consumption and reliability when making digital measuring instruments.

We claim:

1. A pre-settable self-correcting staircase counter comprising: a source of clock pulses having a regular sequence; a storage circuit adapted to receive the pulses to be counted and coupled to said source and including a storage capacitor, a discharge circuit coupled to the storage capacitor, the said storage capacitor including means responsive to the receipt of said clock pulses to develop a voltage having a stair-step wave shape with successive steps initiated by the arrival of said clock pulses at said storage circuit; a control means for providing an adjustable source of a reference voltage to automatically maintain a constant scaling factor independent of parameter changes in the counter including a capacitive element and a discharge element, said capacitive element and discharge element being connected in parallel; a comparator connected to the output of said storage circuit and to said control means and being adapted, when the voltage level of the storage capacitor exceeds the reference voltage, for discharging the storage capacitor through the said discharge circuit; said control means being constituted such that during one operative cycle of said counter, the power fed to said capacitive element is equal to the power discharged by said discharge element; said capacitive element and discharge element each being coupled to said comparator, the capacitive element discharging through the said discharge element during the period of time between successive discharging of the storage capacitor by the comparator and thereby developing a voltage increment; means for forced setting of the said discharge circuit to a conductive condition and means connected to said capacitive element for shaping said voltage increment to correspond to a predetermined scaling factor.

2. A counter as claimed in claim 1 wherein said capacitive element and discharge element include means for predetermining said scaling factors independently of the parameters of the counter.

3. A device according to claim 2 wherein a capacitor constitutes the capacitive element and a resistor constitutes the discharge element.

4. A device according to claim 2 wherein the capacitance of a blocked p-n junction constitutes the capacitive element and a resistor constitutes the discharge element.

5. A device according to claim 2 wherein a capacitor constitutes the capacitive element and a non-linear resistance constitutes the discharge element.

6. A device according to claim 2 wherein the capacitance of a blocked p-n junction constitutes the capacitive element and a controlled resistance constitutes the discharge element.

7. A device according to claim 2 wherein the capacitive and discharge elements are connected to ground.

8. A device according to claim 2 comprising a source of electric bias and wherein the electric circuit comprising capacitive and discharge elements is connected to the source of electric bias.

9. A device as claimed in claim 2 comprising a pulse shaper connected to said discharge circuit.

10. A device as claimed in claim 2 comprising a linearizing emitter follower circuit connected between said storage circuit and comparator and in feedback relation with said storage circuit.

* * * * *